United States Patent
Stamey, Jr. et al.

(10) Patent No.: US 10,898,835 B2
(45) Date of Patent: Jan. 26, 2021

(54) FILTER ELEMENT

(75) Inventors: Willie L. Stamey, Jr., Kings Mountain, NC (US); Mark A. Roll, Bessemer City, NC (US); Robert H. Ferguson, Gastonia, NC (US)

(73) Assignee: MANN+HUMMEL Filtration Technology Group Inc., Gastonia, NC (US)

( * ) Notice: Subject to any disclaimer, the term of this patent is extended or adjusted under 35 U.S.C. 154(b) by 2395 days.

(21) Appl. No.: 12/139,800

(22) Filed: Jun. 16, 2008

(65) Prior Publication Data

US 2008/0283462 A1 Nov. 20, 2008

Related U.S. Application Data

(63) Continuation-in-part of application No. 11/735,092, filed on Apr. 13, 2007.

(60) Provisional application No. 60/791,425, filed on Apr. 13, 2006.

(51) Int. Cl.
*B01D 29/21* (2006.01)
*B01D 29/96* (2006.01)
*B01D 29/92* (2006.01)

(52) U.S. Cl.
CPC ........... *B01D 29/21* (2013.01); *B01D 29/925* (2013.01); *B01D 29/96* (2013.01); *B01D 2201/0415* (2013.01); *B01D 2201/291* (2013.01); *B01D 2201/305* (2013.01); *B01D 2201/316* (2013.01); *B01D 2201/34* (2013.01)

(58) Field of Classification Search
CPC ...................................................... B01D 29/21
USPC ................... 210/232, 437, 438, 457, 458
See application file for complete search history.

(56) References Cited

U.S. PATENT DOCUMENTS

| | | | |
|---|---|---|---|
| RE30,779 E * | 10/1981 | Cooper | 210/232 |
| 6,571,962 B2 * | 6/2003 | Thomas | 210/457 |
| 6,607,665 B2 * | 8/2003 | Fick et al. | 210/238 |
| 2003/0010707 A1 * | 1/2003 | Jokschas et al. | 210/457 |
| 2005/0133433 A1 * | 6/2005 | Rampen | 210/282 |
| 2008/0053886 A1 * | 3/2008 | Marshall et al. | 210/234 |

* cited by examiner

*Primary Examiner* — Peter Keyworth
(74) *Attorney, Agent, or Firm* — Honigman LLP (57) ABSTRACT

A sub-component of a replaceable filter element that is interfacably sealing a standpipe includes an end cap, said second end cap defining a first central opening; a central tube extending from the first central opening of the second end cap, wherein the central tube defines an inner surface, an outer surface and a top surface, wherein the top surface defines a second central opening, wherein the central tube includes an actuator excluding keys, free ends, or projections; and a standpipe seal disposed proximate the top surface of the central tube, wherein the standpipe seal defines a third central opening.

17 Claims, 11 Drawing Sheets

FILTER ELEMENT

RELATED APPLICATION

This application is a continuation-in-part of U.S. patent application Ser. No. 11/735,092 filed on Apr. 13, 2007, which claims the benefit of U.S. Provisional Patent Application Ser. No. 60/791,425 filed on Apr. 13, 2006, the contents of which are fully incorporated herein by reference.

FIELD

The invention relates to filter elements.

BACKGROUND

Various filter elements are known in the art for filtering fluid as it passes through a fluid path. Filter elements include, in part, filtering media which remove impurities from a fluid, such as, for example, oil or fuel that passes through a filter media.

In most applications, either the filter element or the filter media associated therewith must be periodically replaced to reduce the potential of developing unacceptably high impedance in the fluid path flow restriction.

While known filter elements have proven to be acceptable for various applications, such conventional filter elements are nevertheless susceptible to improvements that may enhance their overall performance and cost. Therefore, a need exists to develop improved filter assemblies that advance the art.

BRIEF DESCRIPTION OF THE DRAWINGS

The present disclosure will now be described, by way of example, with reference to the accompanying drawings, in which.

DETAILED DESCRIPTION

The Figures illustrate exemplary embodiments a filter element for a housing in accordance with embodiments of the invention and based on the foregoing, it is to be generally understood that the nomenclature used herein is simply for convenience and the terms used to describe the invention should be given the broadest meaning by one of ordinary skill in the art.

Referring to FIGS. 1-4, a filter element 1500 is shown according to an exemplary embodiment of the invention. According to an embodiment, the filter element 1500 includes an upper, first end cap 1502, a lower, second end cap 1510, filter media 1504, and a central tube 1508 extending from the second end cap 1510. In an embodiment, the central tube 1508 is unitary with the lower end cap 1510, and is formed as one part therewith. In an embodiment, the central tube 1508 is sealingly attached to the lower end cap. Central tube may be fashioned in any number of configurations, for example, a right cylinder, or a conical frustum structure.

Figure 1:
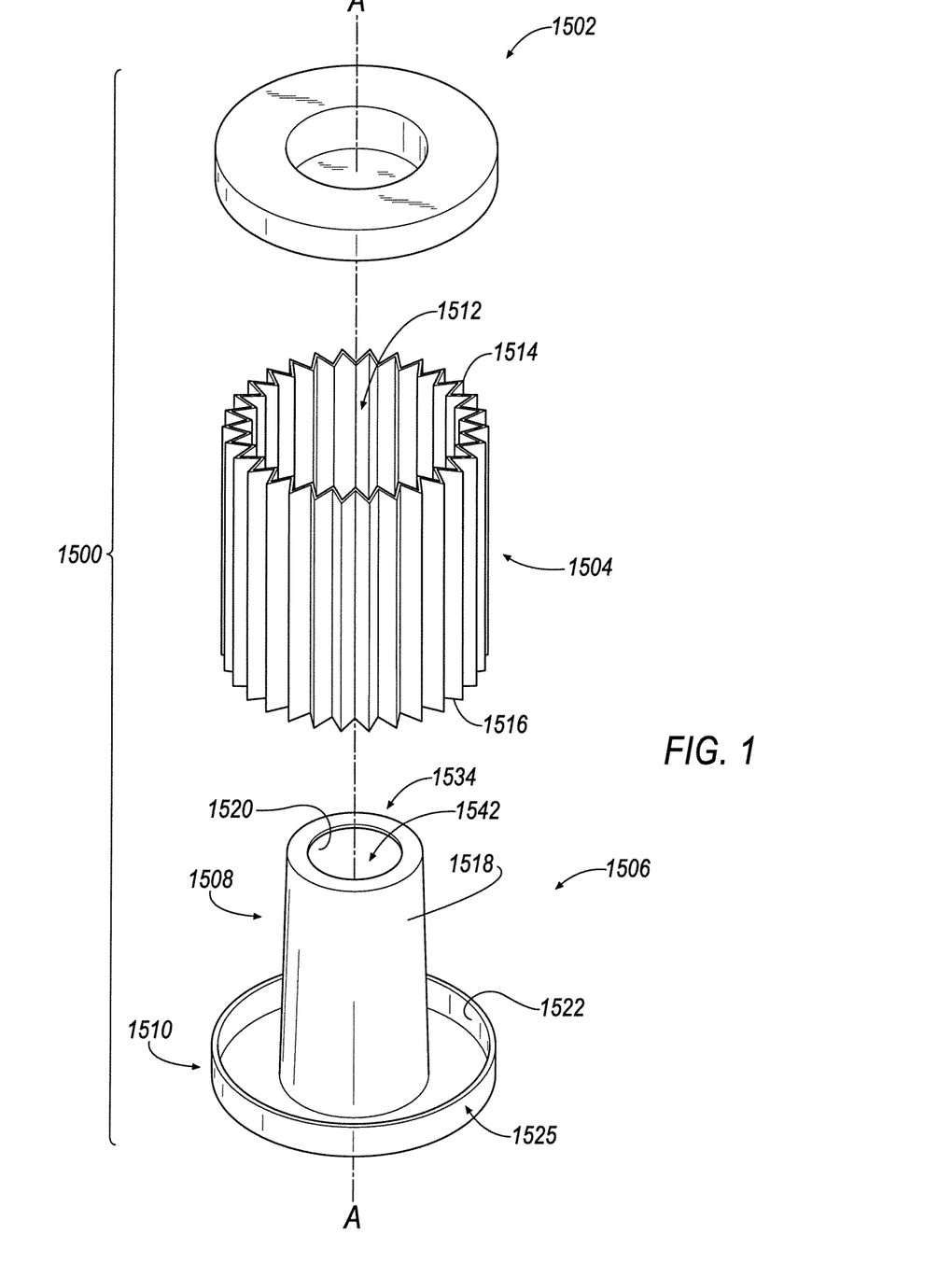
FIG. 1 is an exploded isometric view of a filter element in accordance with an exemplary embodiment of the invention.
Figure 2:
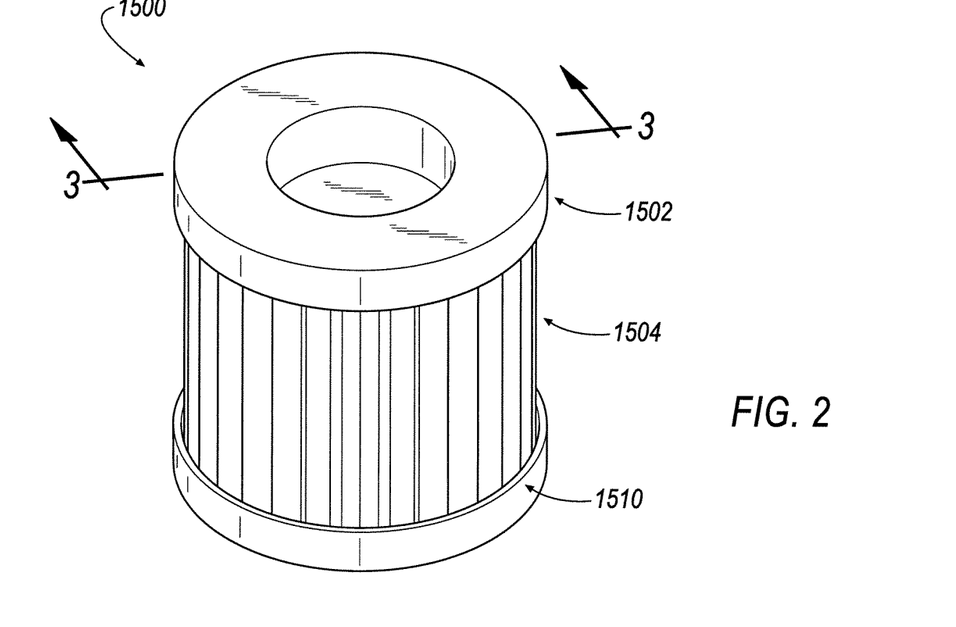
FIG. 2 is an assembled isometric view of the filter element of FIG. 1 in accordance with an exemplary embodiment of the invention.
Figure 3:
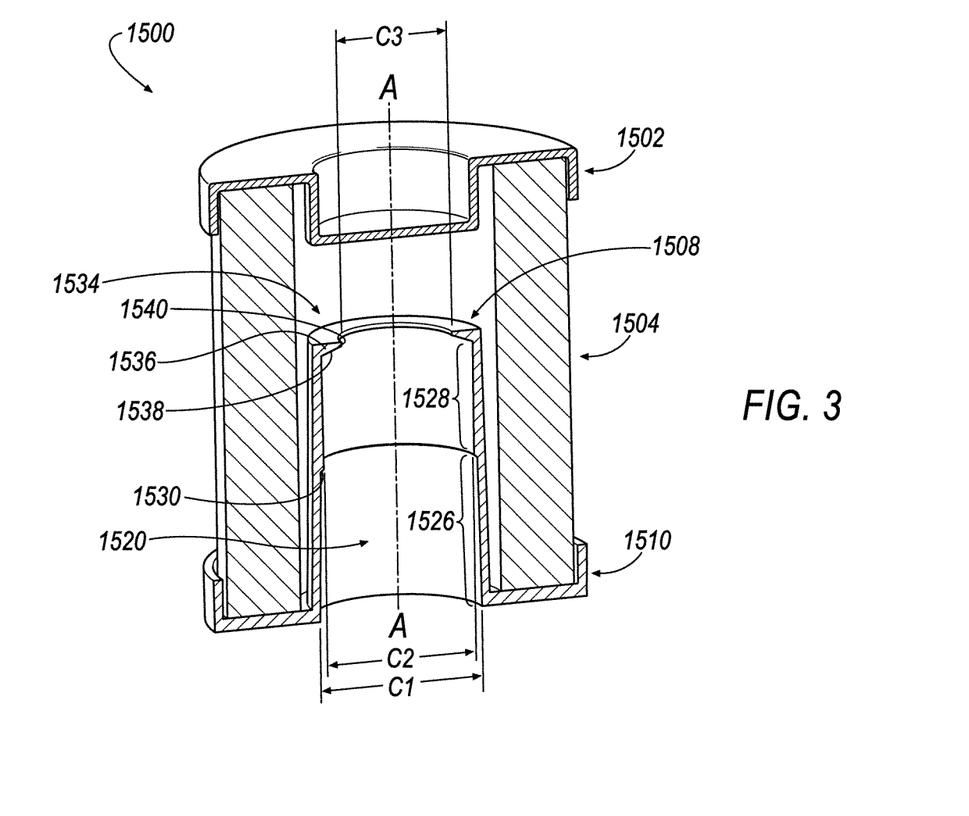
FIG. 3 is an assembled cross-sectional view of the filter element of FIG. 2 taken substantially along line 3-3 in accordance with an exemplary embodiment of the invention.
Figure 4:
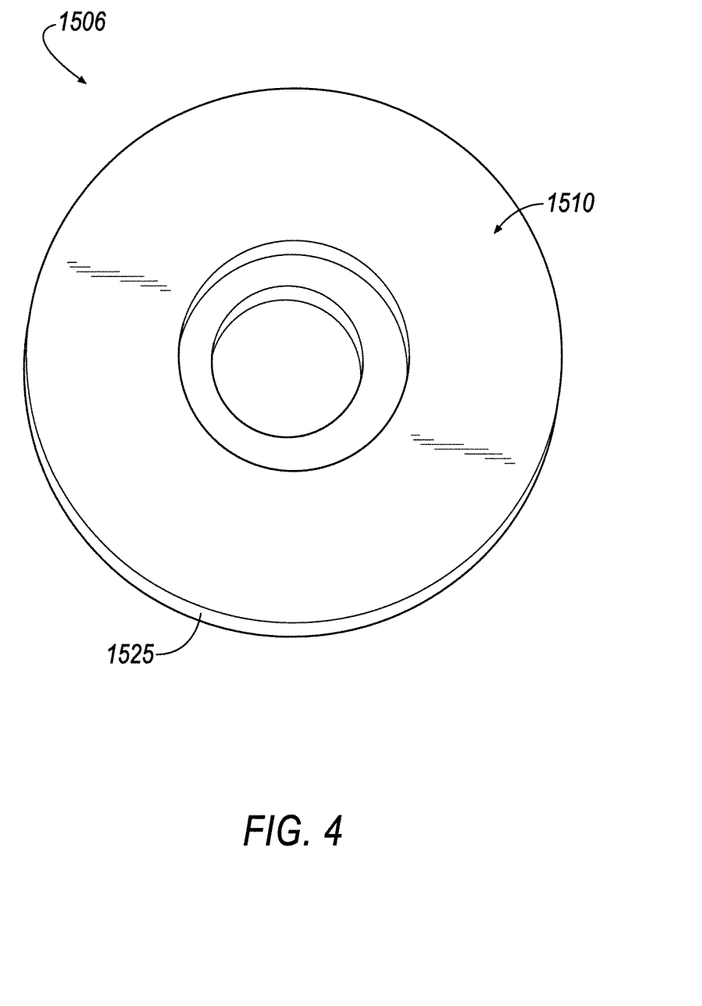
FIG. 4 is a view of an end cap in accordance with an exemplary embodiment of the invention.

According to an embodiment, the filter media 1504 defines an interior volume 1512 that encompasses a central axis, A-A. As seen in FIGS. 2 and 3, the end caps 1502, 1510 support and engage the filter media 1504 in fluid tight relation at a first end 1514 and a second end 1516, respectively, of the filter media 1504 in any desirable manner by using, for example, an adhesive, a potting compound, or the like.

The central tube 1508 may be defined by an outer surface 1518 and an inner surface 1520.

Referring to FIG. 3, in an embodiment, the inner surface 1520 of the central tube 1508 includes a first surface 1526 having a first dimension, C1, and a second surface 1528 having a second dimension, C2. The first and second surfaces 1526, 1528 are demarcated by a shoulder 1530 that projects radially inwardly toward the central axis, A-A. According to an embodiment, the first dimension, C1, is greater than the second dimension, C2. In this embodiment, no key projections, free ends or the like extend from the central tube 1508, to actuate a flow element.

Figure 6:
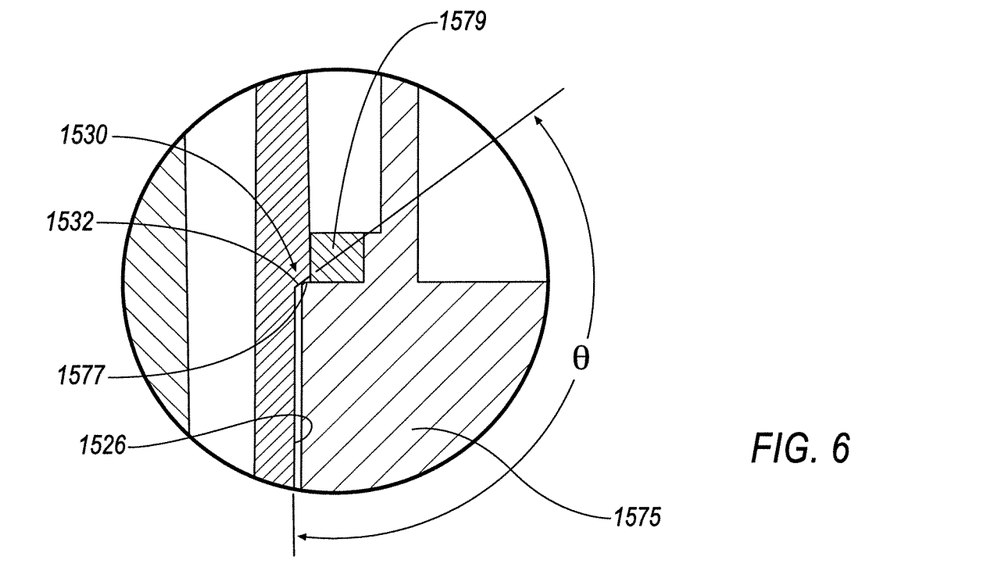
FIG. 6 is a magnified view of FIG. 5 according to line 6 in accordance with an exemplary embodiment of the invention.

In an embodiment, the shoulder portion 1530 includes a shoulder surface 1532 (FIG. 6). In an embodiment, the shoulder surface 1532 is defined by an angle, θ, relative a portion of the first surface 1526. In an embodiment, the angle, θ, is approximately equal to, for example, 135°.

In an embodiment, the first and second surfaces 1526, 1528 are not limited to include a particular arrangement or orientation. For example, in an embodiment, one or more of the first and second surfaces 1526, 1528 may be arranged to define a gradual, fixed or changing slope. In an embodiment, one or more of the first and second surfaces 1526, 1528 may be arranged to define a linear or non-linear slope.

In an embodiment, the central tube 1508 may include a top portion 1534 having a radially extending flange 1536 that projects radially inwardly toward the central axis, A-A. In an embodiment, the radially extending flange 1536 may include a shoulder surface 1538 and a radial surface 1540.

In an embodiment, the shoulder surface 1538 is defined by an angle, (φ (FIG. 7), relative the second surface portion 1528. In an embodiment, the angle, φ, is approximately equal to, for example, 105°.

In an embodiment, at least a portion of the radial surface 1540 defines opening 1542 in the top portion 1534 of central tube 1508. In an embodiment, the opening 1542 is sized by a third dimension, C3, that is less than the second dimension, C2.

Figure 5:
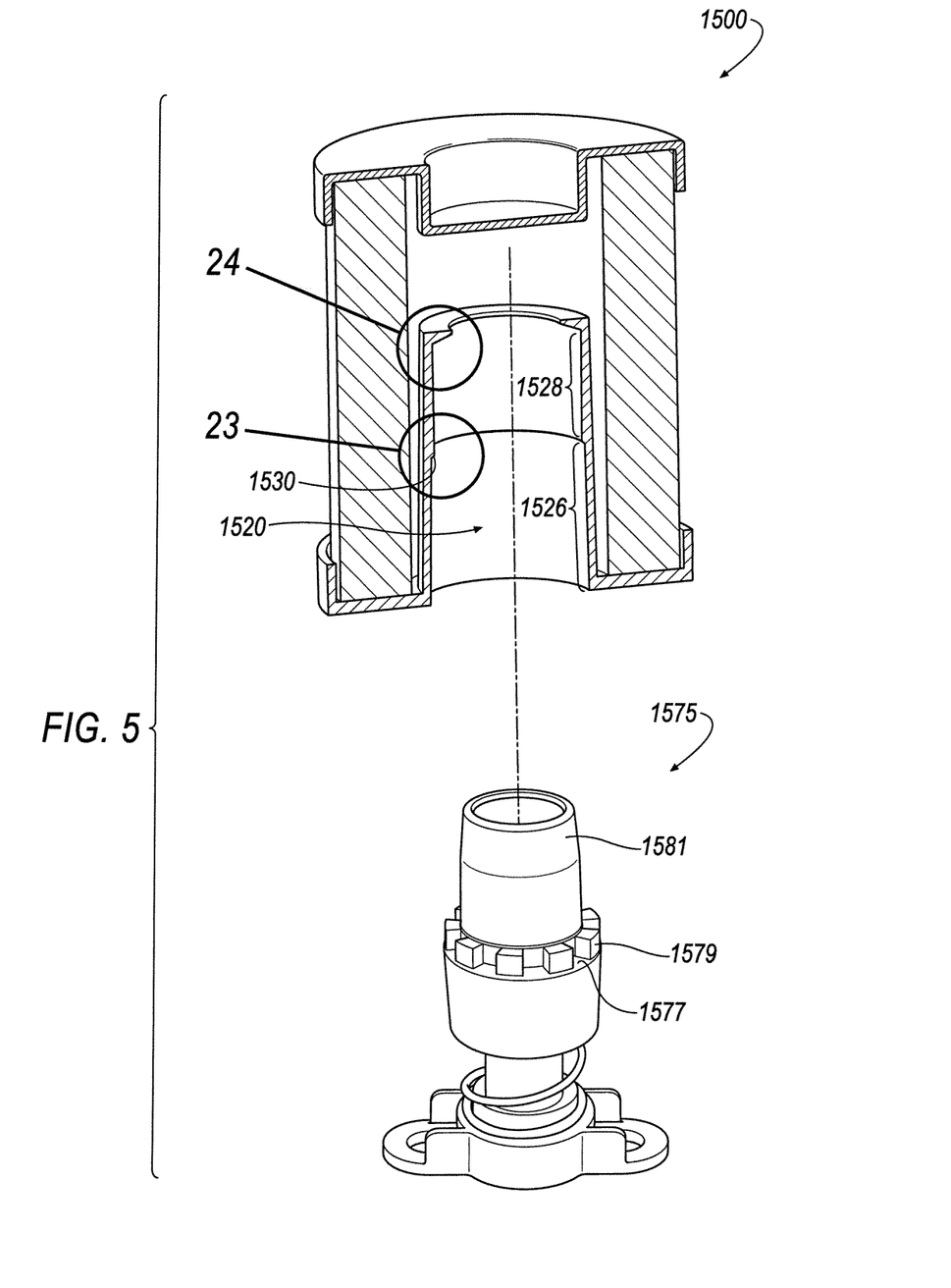
FIG. 5 is an isometric view of a standpipe aligned for insertion into the filter element of FIG. 3 in accordance with an exemplary embodiment of the invention.

Referring to FIGS. 5 and 6, in an embodiment, the inner surface 1520 of the central tube 1508 is sized and shaped to correspondingly receive and seal against a standpipe 1575. According to an embodiment, when the standpipe 1575 is inserted into the central tube, the shoulder portion 1530 contacts a surface portion 1577 of the standpipe 1575. Functionally, the shoulder portion 1530 acts as a projection-less standpipe actuator as the shoulder surface 1532 contacts and engages the axial surface portion 1577 of a valve.

According to an embodiment, the axial surface portion 1577 of the standpipe 1575 may be defined by a top surface portion that defines a plurality of standpipe key sockets 1579 or detents. It will be appreciated that, in an embodiment, the shoulder portion 1530 is a substantially flat surface having no interruptions, corresponding keys, free ends, or projections formed therein but can still actuate the valve without interaction with the key sockets 1579. Because the shoulder surface 1532 is defined to not include a plurality of keys, free ends, or projections, it will be appreciated that the filter element 1500 may be incorporated for use as a replaceable filter component in a filter assembly having a standpipe 1575 having a plurality of standpipe key sockets 1579 although the filter element 1500 is designed without corresponding keys, free ends, or projections.

Figure 7:
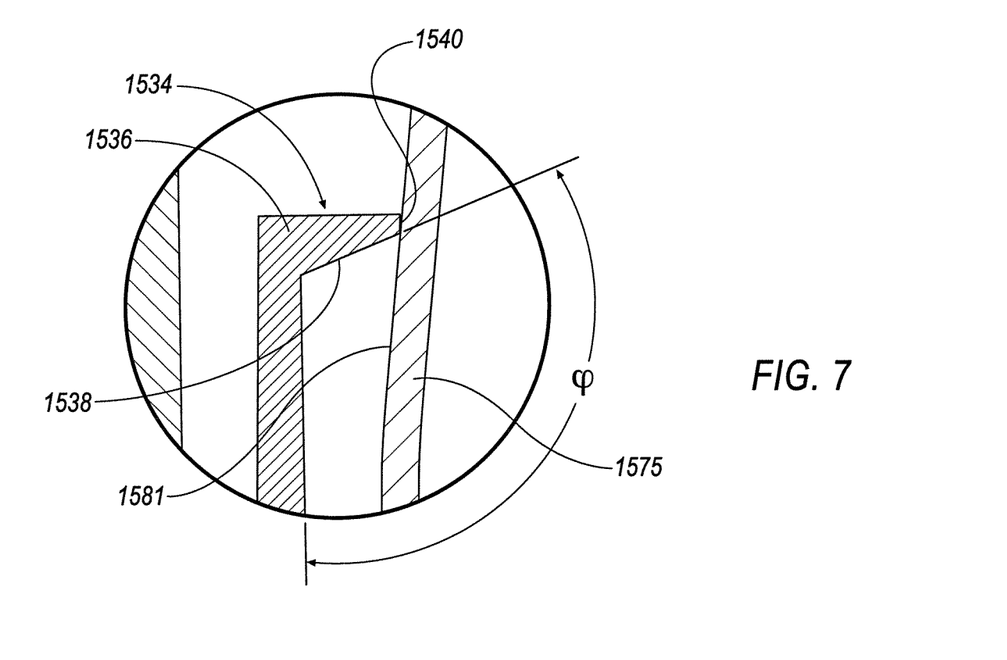
FIG. 7 is a magnified view of FIG. 5 according to line 7 in accordance with an exemplary embodiment of the invention.

With further reference to FIG. 5 and also FIG. 7, in an embodiment, the shoulder surface 1538 abuts a peripheral surface 1581 of the standpipe 1575 upon inserting the standpipe 1575 into the passage 1512. In an embodiment, the radial surface 1540 presses seals against the peripheral radial surface portion 1581.

Figure 8:
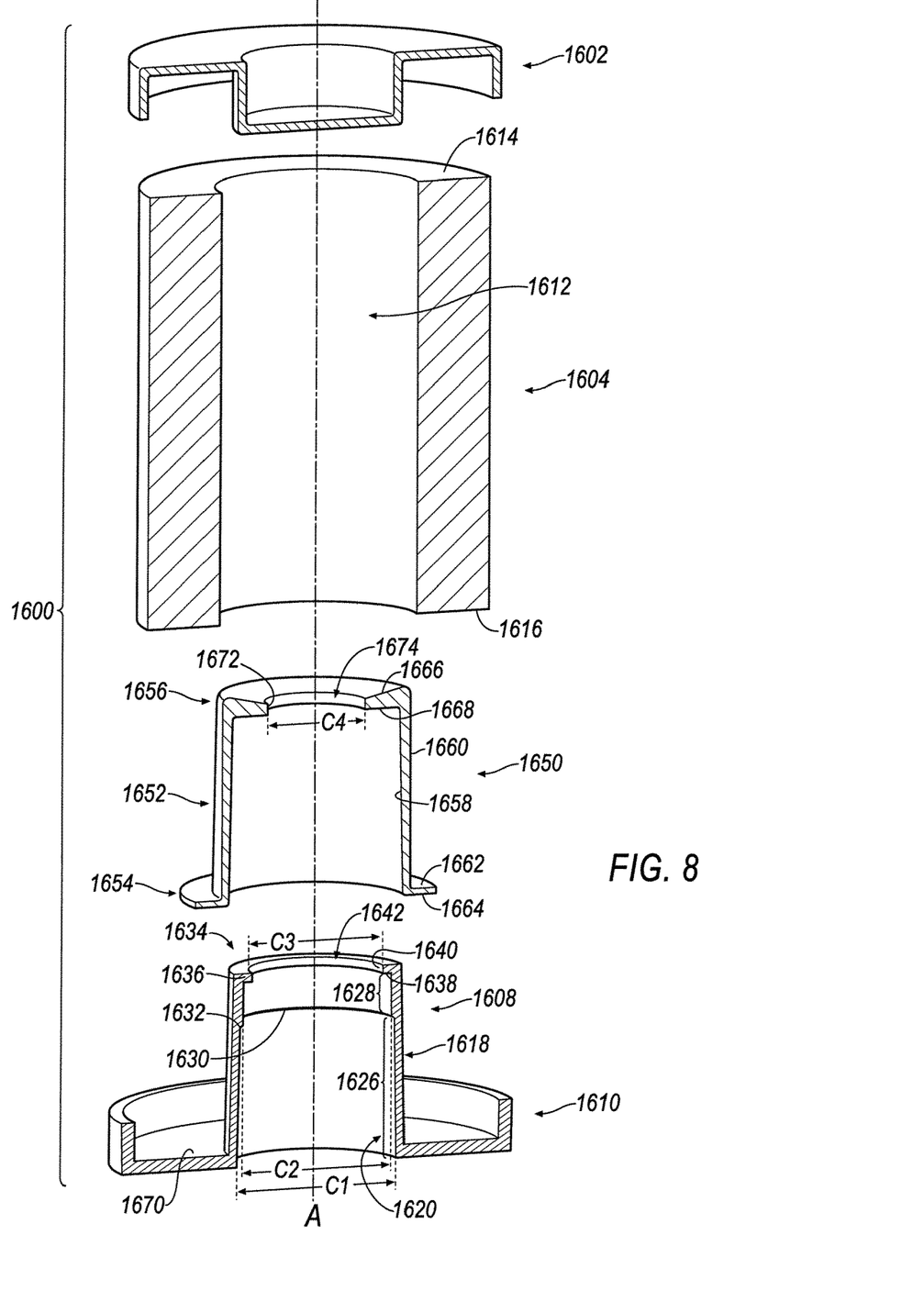
FIG. 8 is an exploded, cross-sectional view of a filter element in accordance with an exemplary embodiment of the invention.
Figure 9:
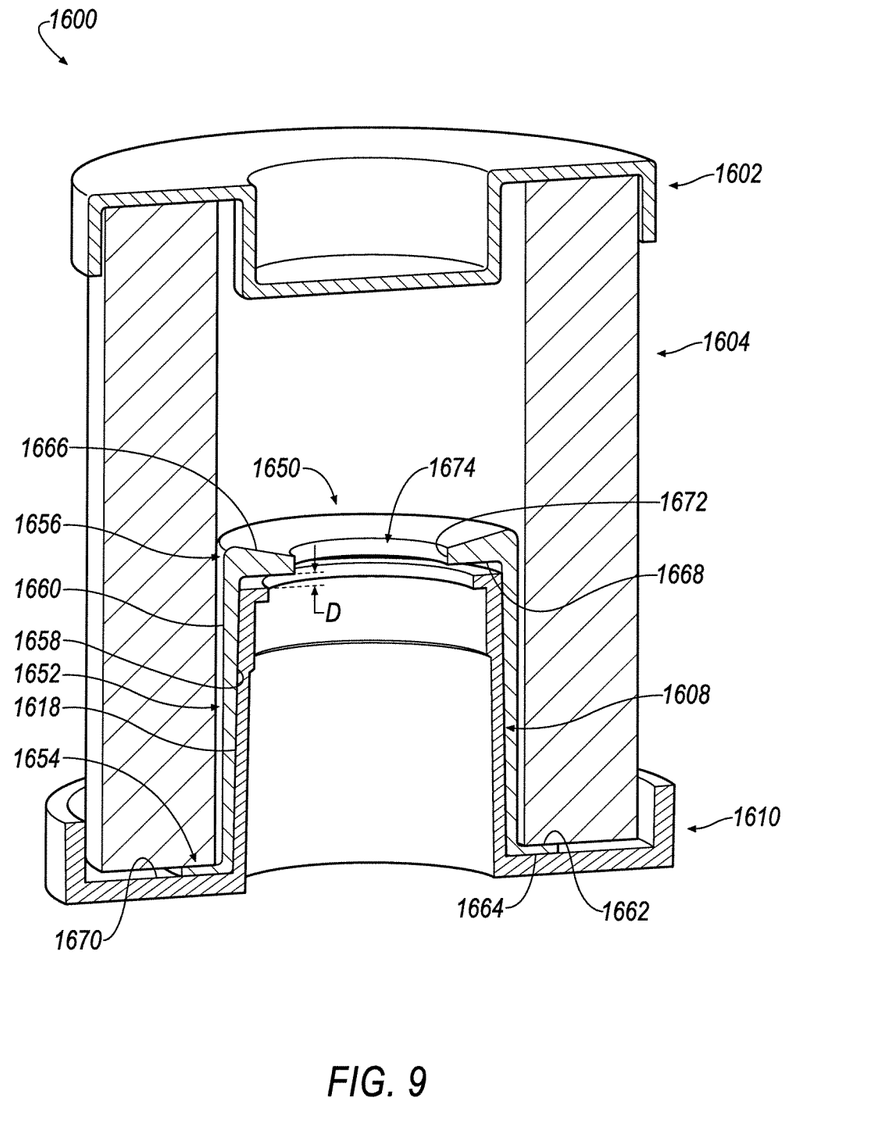
FIG. 9 is an assembled, cross-sectional view of the filter element according to FIG. 8.

Referring to FIGS. 8 and 9, a replaceable filter element 1600 is shown according to an exemplary embodiment of the invention. According to an embodiment, the filter element 1600 includes an upper, first end cap 1602, a lower, second end cap 1610, filter media 1604, and a central tube 1608 extending from the second end cap 1610.

In an embodiment, the central tube 1608 and lower end cap define a sub-component of the replaceable filter element 1600. In an embodiment, the central tube 1608 is unitary with the lower end cap 1610, and is formed as one part therewith. In an embodiment, the central tube 1608 is sealingly attached to the lower end cap 1610. The central tube 1608 may be fashioned in any number of configurations, for example, a right cylinder, or a conical frustum structure.

According to an embodiment, the filter media 1604 defines an interior volume 1612 that encompasses a central axis, A-A. The end caps 1602, 1610 support and engage the filter media 1604 in fluid tight relation at a first end 1614 and a second end 1616, respectively, of the filter media 1604 in any desirable manner by using, for example, an adhesive, a potting compound, or the like. In an embodiment, the central tube 1608 may be defined by an outer surface 1618 and an inner surface 1620.

In an embodiment, the inner surface 1620 is substantially similar to the inner surface 1520 of the central tube 1508 as shown and described in FIGS. 3-7; as such, in an embodiment, the inner surface 1620 includes a first surface 1626 having a first diameter, C1, and a second surface 1628 having a second diameter, C2. The first and second surfaces 1626, 1628 are demarcated by a shoulder 1630 that projects radially inwardly toward the central axis, A-A. According to an embodiment, the first diameter, C1, is greater than the second diameter, C2. In this embodiment, no key projections, free ends or the like extend from the central tube 1608, to actuate a flow element.

In an embodiment, the first and second surfaces 1626, 1628 are not limited to include a particular arrangement or orientation. For example, in an embodiment, one or more of the first and second surfaces 1626, 1628 may be arranged to define a gradual, fixed or changing slope. In an embodiment, one or more of the first and second surfaces 1626, 1628 may be arranged to define a linear or non-linear slope.

In an embodiment, the shoulder portion 1630 includes a shoulder surface 1632. In an embodiment, the shoulder surface 1632 is defined by an angle, θ, that is similarly shown and described in FIG. 6. In an embodiment, the angle, θ, is approximately equal to, for example, 135°.

In an embodiment, the central tube 1608 may include a top portion 1634 having a radially extending flange 1636 that projects radially inwardly toward the central axis, A-A. In an embodiment, the radially extending flange 1636 may include a shoulder surface 1638 and a radial surface 1640. In an embodiment, the radially-extending flange 1636 may project substantially perpendicularly from the second surface 1628. Alternatively, in an embodiment, the shoulder surface 1638 of the radially extending flange 1636 may project at an angle that is substantially similar to the angle, φ, shown and described in FIG. 7.

In an embodiment, at least a portion of the radial surface 1640 defines opening 1642 in the top portion 1634 of central tube 1608. In an embodiment, the opening 1642 is defined by a third diameter, C3, that is less than the second diameter, C2.

In an embodiment, the inner surface 1620 of the central tube 1608 is sized and shaped to correspondingly engage a standpipe 1575, which is shown, for example, in FIG. 5. According to an embodiment, when the standpipe 1575 is inserted into the central tube 1608, the shoulder portion 1630 contacts a surface portion 1577 of the standpipe 1575. Functionally, the shoulder portion 1630 acts as a projection-less standpipe actuator as the shoulder surface 1632 contacts and engages the axial surface portion 1577 of the valve.

According to an embodiment, the axial surface portion 1577 of the standpipe 1575 may be defined by a top surface portion that defines a plurality of standpipe key sockets 1579 or detents. It will be appreciated that the shoulder portion 1630 is a substantially flat surface having no interruptions, corresponding keys, free ends, or projections formed therein but can still actuate the valve without interaction with the key sockets 1579. Because the shoulder surface 1632 is defined to not include a plurality of keys, free ends, or projections, it will be appreciated that the filter element 1600 may be incorporated for use as a replaceable filter component in a filter assembly having a standpipe 1575 having a plurality of standpipe key sockets 1579 although the filter element 1600 is designed without corresponding keys, free ends, or projections. Further, in an embodiment, the shoulder surface 1638 abuts a peripheral surface 1581 of the standpipe 1575 upon inserting the standpipe 1575 into the passage 1612. Further, in an embodiment, the radial surface 1640 presses seals against the peripheral radial surface portion 1581.

In an embodiment, the filter element 1600 also includes a seal, which is shown generally at 1650. According to an embodiment, at least a portion of the seal 1650 is annular, which is shown and defined generally at 1656 according to an embodiment. Functionally, at least a portion of the seal 1650 contact and seals against the standpipe 1575.

In an embodiment, the substantially cylindrical portion 1652 is further defined to include an inner surface 1658 and an outer surface 1660. In an embodiment, the first flange portion 1654 is further defined to include an upper surface 1662 and a lower surface 1664. In an embodiment, the second flange portion 1656 is defined to include an upper surface 1666 and a lower surface 1668.

In an embodiment, the seal 1650 includes a substantially cylindrical, axial portion 1652, a first flange portion 1654 extending radially from the substantially cylindrical portion 1652 and a second flange portion 1656 extending radially from the substantially cylindrical portion 1652. In an embodiment, the first flange portion 1652 extends radially away from the substantially cylindrical, axial portion 1652 whereas the second flange portion 1656 extends radially inwardly from the substantially cylindrical axial portion 1652. In an embodiment, the first flange portion 1654 extends radially from a first, lower terminal end of the cylindrical axial portion 1652 whereas the second flange portion 1656 extends radially from a second, upper terminal end of the cylindrical axial portion 1652.

In an embodiment, the lower surface 1664 of the first flange portion 1654 is disposed substantially adjacent an upper surface 1670 of the lower, second end cap 1610. In an embodiment, the inner surface 1658 of the substantially cylindrical portion 1652 is disposed adjacent the outer surface 1618 of the central tube 1608. In an embodiment, the lower surface 1668 of the second flange portion 1656 is axially spaced at a distance, D (see, e.g., FIG. 9), from the top portion 1634 of central tube 1608.

In an embodiment, the lower surface 1668 of the second flange portion 1656 may also be referred to as a shoulder surface. In an embodiment, the second flange portion 1656 may also include a radial surface, which is shown generally at 1672, that extends between the upper and lower surfaces 1666, 1668 of the second flange portion 1656.

In an embodiment, the lower surface 1668 of the second flange portion 1656 projects substantially perpendicularly from the inner surface 1658 of the substantially cylindrical axial portion 1652. In an embodiment, at least a portion of the radial surface 1672 defines an opening 1674 formed by the second flange portion 1656. In an embodiment, the opening 1674 is defined by a fourth diameter, C4, that is less than the third diameter, C3.

In an embodiment, the seal 1650 may be snugly fitted to the central tube 1608. In an embodiment, the snug fitting of the seal 1650 and the central tube 1608 may be referred to as a friction-fit.

Alternatively, in an embodiment, the seal 1650 may be adhered to the central tube 1608. In an embodiment, one or more surfaces 1658, 1664 and 1668 of the seal 1650 may be adhered to one or more surfaces 1618, 1634 and 1670 of the central tube 1608. For example, in an embodiment, the lower surface 1668 of the second flange portion 1656 of the seal 1650 may be adhered to the top portion 1634 of the central tube 1608. In an embodiment, the inner surface 1658 of cylindrical axial portion 1652 may be adhered to the outer surface 1618 of the central tube 1608. In an embodiment, the lower surface 1664 of the first flange portion 1654 may be adhered to the upper surface 1670 of the lower, second end cap 1610.

Functionally, the radial surface 1672 defining the opening 1674 permits the standpipe 1575 to pass therethrough. Upon passing through the opening 1674, the peripheral radial surface portion 1581 of the standpipe 1575 sealingly-engages the radial surface 1672 of the seal 1650. In an embodiment, the seal 1650 may comprise any desirable material that permits the second flange portion 1656 to materially deform or flex upon interfacing the standpipe 1575 with the seal 1650.

Figure 10:
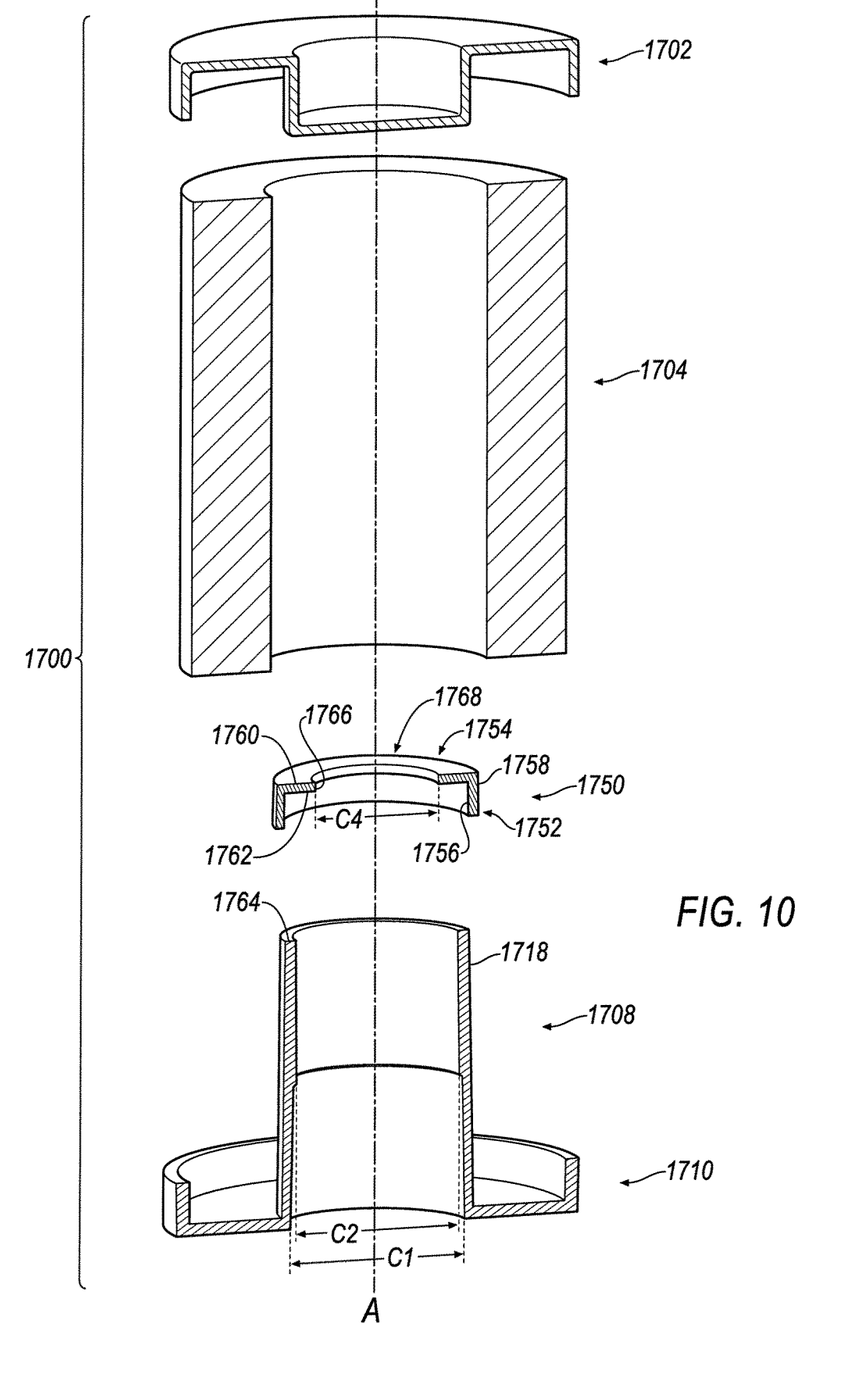
FIG. 10 is an exploded, cross-sectional view of a filter element in accordance with an exemplary embodiment of the invention.
Figure 11:
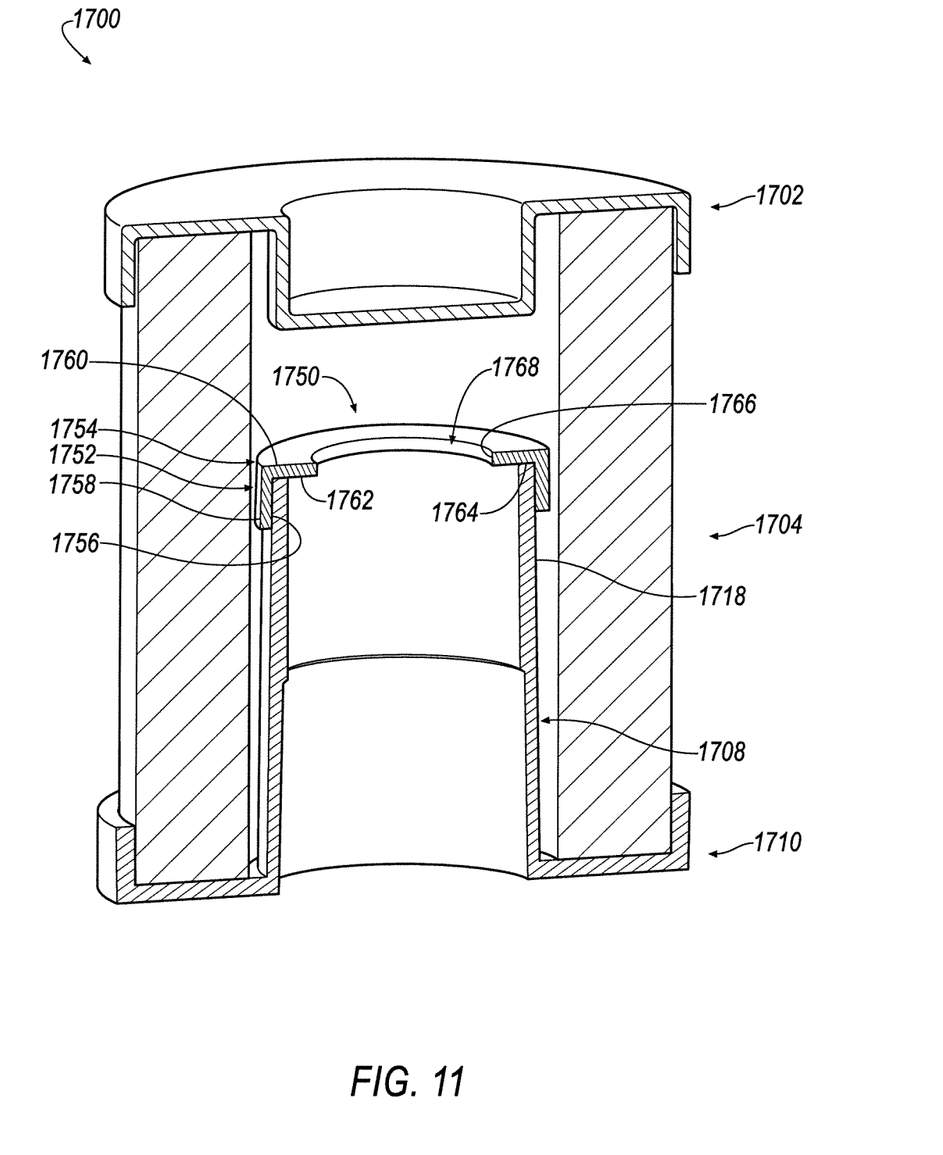
FIG. 11 is an assembled, cross-sectional view of the filter element according to FIG. 10.

Referring to FIGS. 10 and 11, a replaceable filter element 1700 is shown according to an exemplary embodiment of the invention. According to an embodiment, the filter element 1700 includes an upper, first end cap 1702, a lower, second end cap 1710, filter media 1704, and a central tube 1708 extending from the second end cap 1710.

In an embodiment the central tube 1708 and the second end cap 1710 generally define a sub-component of the replaceable filter element 1700. In an embodiment, the central tube 1708 is unitary with the lower end cap 1710, and is formed as one part therewith. In an embodiment, the central tube 1708 is sealingly attached to the lower end cap 1710. The central tube 1708 may be fashioned in any number of configurations, for example, a right cylinder, or a conical frustum structure.

In general, the constituents of the filter element 1700 shown generally at 1702-1710 are substantially similar to that shown at 1602-1610 in FIGS. 8-9 with the exception that the central tube 1708 does not include a radially extending flange (i.e. seen at 1636 in FIGS. 8-9). Similar to the filter element 1600, the filter element 1700 includes a seal, which is shown generally at 1750.

According to an embodiment, at least a portion of the seal 1750 defines a loop, ring, or the like, which is shown and defined generally at 1754 according to an embodiment. Functionally, at least a portion of the seal 1750 presses against and seals the standpipe 1575. Further aspects of the seal 1750 are described in the foregoing disclosure.

In an embodiment, the seal 1750 includes a substantially cylindrical axial portion 1752 and a flange portion 1754 extending from the substantially cylindrical portion 1752. In an embodiment, the flange portion 1754 extends radially inwardly from the substantially cylindrical axial portion 1752.

In an embodiment, the substantially cylindrical portion 1752 is further defined to include an inner surface 1756 and an outer surface 1758. In an embodiment, the flange portion 1754 is further defined to include an upper surface 1760 and a lower surface 1762.

In an embodiment, the inner surface 1756 of the substantially cylindrical portion 1752 is disposed adjacent an outer surface 1718 of the central tube 1708. In an embodiment, the lower surface 1762 of the flange portion 1754 is adjacent an upper surface 1764 of the central tube 1708.

In an embodiment, the lower surface 1762 of the flange portion 1754 may also be referred to as a shoulder surface. In an embodiment, the flange portion 1754 may also include a radial surface, which is shown generally at 1766, that extends between the upper and lower surfaces 1760, 1762 of the flange portion 1754.

In an embodiment, the lower surface 1762 of the flange portion 1754 projects substantially perpendicularly from the inner surface 1756 of the substantially cylindrical axial portion 1752. In an embodiment, at least a portion of the radial surface 1766 defines an opening 1768 formed by the flange portion 1754.

In an embodiment, because the central tube 1708 does not include a radially extending flange, the filter element 1700 does not define a third diameter, C3, as previously shown and described in FIGS. 1-9; however, with the inclusion of the seal 1750, a diameter, which is seen generally at C4, is provided. The diameter, C4, is substantially similar to the fourth diameter shown and described in FIGS. 8 and 9. In an embodiment, the opening 1768 defines the diameter, C4, and, the diameter, C4, is less than the diameters C2 and C1.

Functionally, the radial surface 1766 defining the opening 1768 permits the standpipe 1575 to pass therethrough. Upon passing through the opening 1768, the peripheral radial surface portion 1581 of the standpipe 1575 sealingly-engages the radial surface 1766 of the seal 1750. In an embodiment, the seal 1750 may comprise any desirable material that permits the flange portion 1754 to materially deform or flex upon interfacing the standpipe 1575 with the seal 1750.

Figure 12:
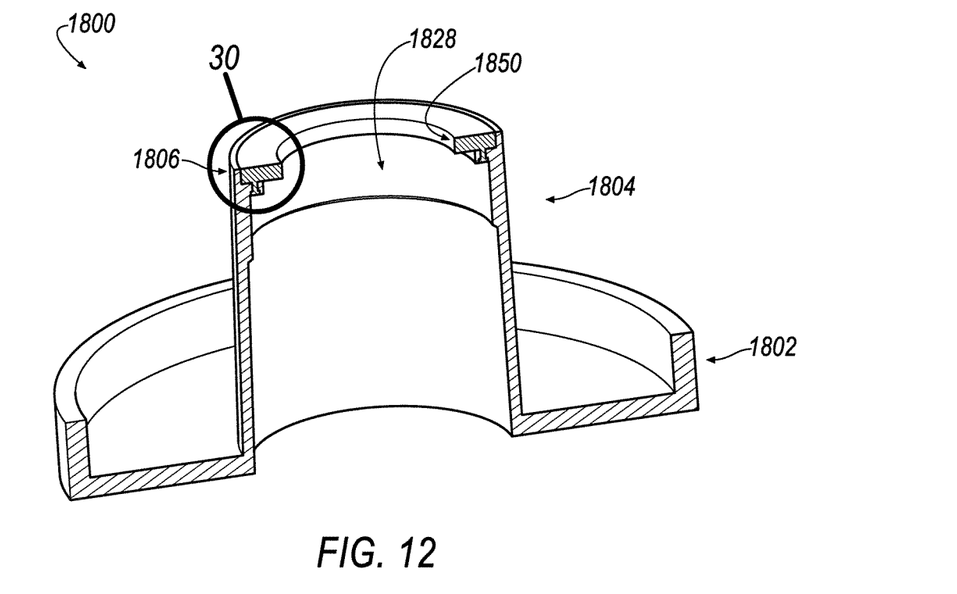
FIG. 12 is a cross-sectional view of a lower end cap and seal in accordance with an exemplary embodiment of the invention.

Referring to FIG. 12, a sub-component of a replaceable filter element is shown generally at 1800 according to an embodiment. The sub-component 1800 includes an end cap 1802 and a central tube 1804 extending from the second end cap 1802. In an embodiment, the central tube 1804 is unitary with the end cap 1804, and is formed as one part therewith.

In an embodiment, the central tube 1804 is sealingly attached to the end cap 1802. In an embodiment, the central tube 1804 may be fashioned in any number of configurations, for example, a right cylinder, or a conical frustum structure. In an embodiment, the end cap 1802 is a lower end cap; as such, in an embodiment, the sub-component 1800 may be substituted for any one of the sub-components including the lower end caps and central tubs 1508, 1510, 1608, 1610 and 1708, 1710 shown and described in FIGS. 1-11.

In an embodiment, the central tube 1804 is substantially similar to the central tube 1508, 1608 and 1708 shown and described in FIGS. 1-11, and, as such, the constituents of which are not described in greater detail here. However, in an embodiment, the central tube 1804 includes a top portion 1806 having a novel structural configuration for retaining a seal 1850, which is described in greater detail in the foregoing disclosure.

According to an embodiment, at least a portion of the seal 1850 defines a loop, ring, or the like. Functionally, at least a portion of the seal 1850 presses against and seals the standpipe 1575. Further aspects of the seal 1850 are described in the foregoing disclosure.

Figure 13:
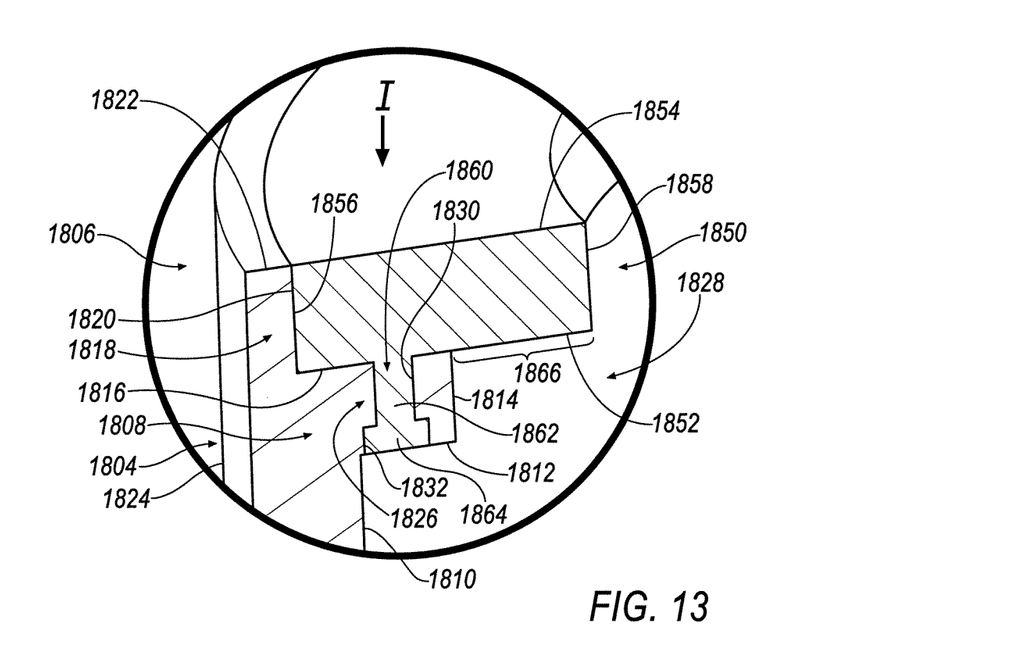
FIG. 13 is a magnified view of FIG. 12 according to line 13.

Referring to FIG. 13, the top portion 1806 of the central tube 1804 defines a first flange 1808 the projects radially inwardly in a substantially perpendicular direction relative an inner surface 1810 of the central tube 1804. The first flange 1808 is generally defined by a lower surface 1812, a first radial surface 1814 and an upper, seal support surface 1816.

In an embodiment, the top portion 1806 of the central tube 1804 further defines a second flange 1818 that projects axially away from the upper, seal support surface 1816. In an embodiment, the second flange 1818 is generally defined by a second radial surface 1820, an upper surface 1822 and an outer surface 1824. In an embodiment, the outer surface 1824 is continuous with and also defines the outer surface of the central tube 1804.

In an embodiment, the first flange 1808 generally defines a first passage, which is shown generally at 1826, and a second passage, which is shown generally at 1828. In an embodiment, the first passage 1826 extends substantially axially through the first flange 1808 between the lower surface 1812 and the upper, seal support surface 1816. In an embodiment, the second passage 1828 is generally defined by the first radial surface 1814.

In an embodiment the seal 1850 is generally defined by a loop, ring or the like including a lower surface 1852, an upper surface 1854, an outer radial surface 1856 and an inner radial surface 1858. Further, in an embodiment, the seal 1850 include an interlocking, t-shaped flange 1860 that extends axially from the lower surface 1852.

In an embodiment, the interlocking, t-shaped flange 1860 is defined to include a neck portion 1862 and a head portion 1864. In an embodiment, the interlocking, t-shaped flange 1860 is integrally formed with the seal 1850.

In an embodiment, the lower surface 1852 and the outer radial surface 1856 of the seal 1850 are disposed substantially adjacent the upper, seal support surface 1816 and the second radial surface 1820. In an embodiment, the seal 1850 is supported by the upper, seal support surface 1816 in a cantilevered fashion such that a portion of the lower surface 1852 of the seal 1850 is not supported by the upper, seal support surface 1816. The portion of the lower surface 1852 of the seal 1850 that is not supported by the upper, seal support surface 1816 is shown generally at 1866.

Functionally, the radial surface 1858 permits the standpipe 1575 to pass through the second passage 1828. Upon passing through the second passage 1828, the peripheral radial surface portion 1581 of the standpipe 1575 sealingly-engages one or more of the portion 1866 of the lower surface 1852 and the radial surface 1858 of the seal 1850. In an embodiment, the seal 1850 may comprise any desirable material that permits the seal 1850 to materially deform or flex upon interfacing the standpipe 1575 with the seal 1850.

In an embodiment, the interlocking, t-shaped flange 1860 is disposed within the first passage 1826. In an embodiment, the first passage 1826 is defined to include a first passage portion 1830 and a second passage portion 1832. In an embodiment, the first passage portion 1830 is narrower than the second passage portion 1832. In an embodiment, the neck portion 1862 of the interlocking, t-shaped flange 1860 is disposed within the first passage portion 1830 and the head portion 1864 of the interlocking, t-shaped flange 1860 is disposed within the second passage portion 1832.

In an embodiment, the seal 1850 is coupled with the top portion 1806 of the central tube 1804 by inserting the interlocking, t-shaped flange 1860 into the first passage 1826 according to the direction of the arrow, I. In an embodiment, an adhesive may be utilized to adhere the seal 1850 to the top portion 1806 of the central tube 1804. In an embodiment, upon coupling the seal 1850 with the top portion 1806 of the central tube 1806, a welding operation, such as, for example, an ultrasonic welding operating may be conducted to join the seal 1850 and top portion 1806 of the central tube 1804.

In an embodiment, the seal 1850 may be molded with the central tube 1804 in a molding operation. In an embodiment, the molding operation may include a two-shot molding operation such that a first material comprising one of the seal 1850 and central tube 1804 is provided into a mold tool (not shown), and, upon forming one of the seal 1850 and the central tube 1804 with the first material, a second material is provided into the mold tool to form the other of the seal 1850 and the central tube 1804.

Figure 14:
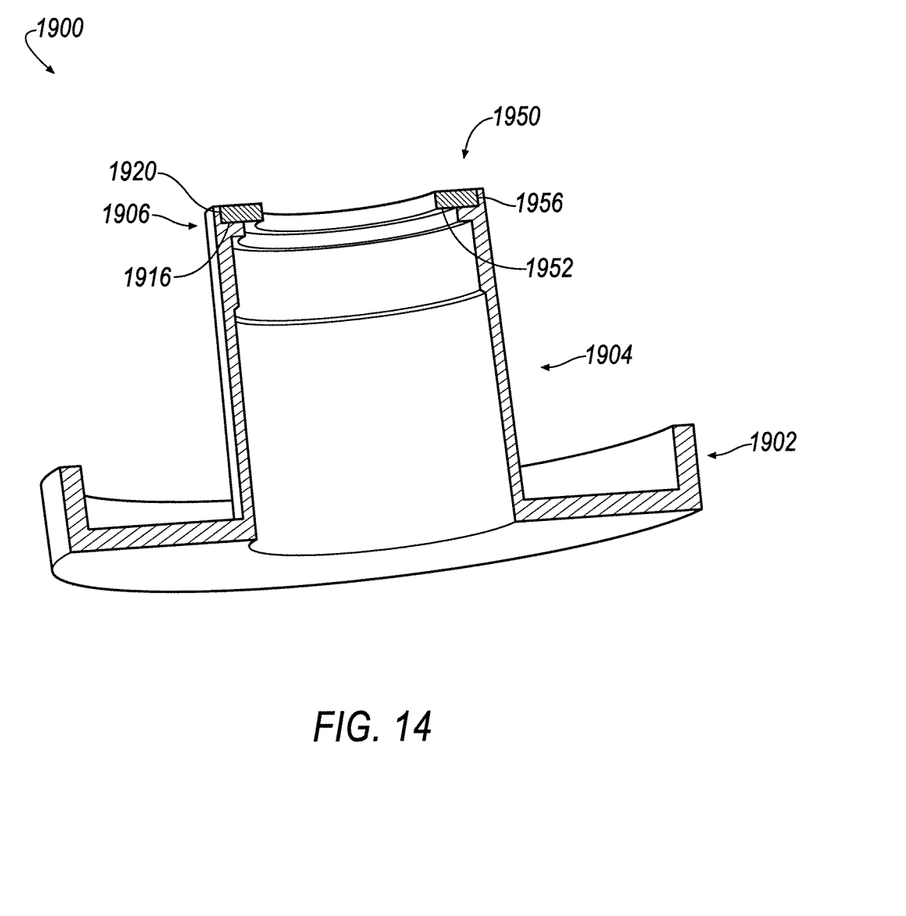
FIG. 14 is a cross-sectional view of a lower end cap and seal in accordance with an exemplary embodiment of the invention.

Referring to FIG. 14, a sub-component of a filter element is shown generally at 1900 according to an embodiment. The sub-component 1900 includes an end cap 1902 and a central tube 1904 extending from the second end cap 1902. In an embodiment, the central tube 1904 is unitary with the end cap 1904, and is formed as one part therewith. A seal, which is shown generally at 1950, is provided with the component 1900.

According to an embodiment, at least a portion of the seal 1950 defines a loop, ring, or the like. Functionally, at least a portion of the seal 1950 presses against and seals the standpipe 1575. Further aspects of the seal 1950 are described in the foregoing disclosure.

The sub-component 1900 is substantially similar to the component 1800 shown and described in FIGS. 12-13 with the exception that the seal 1950 does not include interlocking, t-shaped flange 1860. Further, a top portion 1906 of the central tube 1904 does not include the first passage 1826 for receiving the interlocking, t-shaped flange 1860. Accordingly, as similarly described above in FIG. 13, a lower surface 1952 and an outer radial surface 1956 of the seal 1950 are disposed substantially adjacent an upper, seal support surface 1916 and a second radial surface 1920 of the top portion 1906 of the central tube 1904 such that a portion of the seal 1950 extends radially inwardly in a cantilevered fashion upon the top portion 1096 of the central tube 1904.

In an embodiment, an adhesive may be utilized to adhere the seal 1950 to the top portion 1906 of the central tube 1904. In an embodiment, upon disposing the seal 1950 upon the top portion 1906 of the central tube 1906, a welding operation, such as, for example, an ultrasonic welding operating may be conducted to join the seal 1950 and top portion 1906 of the central tube 1904.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A sub-assembly of a replaceable filter element interfaceable with a standpipe, comprising:
   an end cap defining a first central opening;
   a central tube integrally connected to the end cap and circumscribing the first central opening, wherein the central tube includes: a proximal end that is integrally connected to the end cap, a distal end opposite the proximal end, wherein the distal end forms a second central opening, an outer side surface extending between the proximal end and the distal end, wherein the outer side surface extends substantially perpendicularly with respect to an upper surface of the end cap for an entire length of the central tube from the proximal end to the distal end, and an inner side surface extending between the proximal end and the distal end, wherein the inner side surface forms a central passage that extends through the central tube from the proximal end to the distal end, wherein access to the central passage is permitted by each of the first central opening and the second central opening, wherein the inner side surface includes: a first segment extending from the proximal end, an intermediate shoulder segment extending from the first segment, and a second segment extending from the intermediate shoulder segment, wherein the first segment forms the central passage to include a first constant diameter, wherein the second segment forms the central passage to include a second constant diameter, wherein the second diameter is less than the first diameter, wherein the intermediate shoulder segment forms the central passage to include a non-constant diameter; and
   a seal disposed at least proximate a top surface of the distal end of the central tube, at least a portion of the seal being disposed adjacent the outer side surface of the central tube, and the seal being operable to prevent a flow of fluid from an outer side surface of the seal to the outer side surface of the central tube, the seal including a seal flange projecting radially outwardly from the portion of the seal disposed adjacent the outer side surface of the central tube, the seal flange directly engaging the end cap,
   wherein the distal end of the central tube includes a flange that projects radially inwardly from the inner side surface of the central tube to define the second central opening having a third diameter that is less than the second diameter, and
   wherein the seal includes an inner radial surface that defines a third central opening having a fourth diameter that is less than the third diameter.

2. The sub-assembly of the replaceable filter element according to claim 1, wherein the flange of the distal end of the central tube resides between the seal and the end cap.

3. The sub-assembly of the replaceable filter element according to claim 1, wherein the seal further comprises an elongate cylindrical portion having a first end and a second distal end and a flange portion extending radially inwardly from the second end, the flange portion having the inner radial surface that defines the third central opening such that the second opening of the central tube resides between the flange portion of the seal and the end cap.

4. The sub-assembly of the replaceable filter element according to claim 1, wherein the first segment includes a first inner segment surface, wherein the second segment includes a second inner segment surface, wherein the intermediate shoulder segment includes an inner shoulder surface, wherein each of the first inner segment surface and the second inner segment surface are substantially perpendicular with respect to the upper surface of the end cap, wherein the inner shoulder surface is not substantially perpendicular with respect to the upper surface of the end cap.

5. The sub-assembly of the replaceable filter element according to claim 4, wherein the inner shoulder surface is a standpipe actuator.

6. The sub-assembly of the replaceable filter element according to claim 4, wherein the flange that projects radially inwardly from the inner side surface of the central tube includes a radial surface, wherein the radial surface at least partially seals against the standpipe.

7. The sub-assembly of the replaceable filter element according to claim 1, wherein the seal is arranged:
   directly adjacent the end cap,
   directly adjacent the outer side surface of the entire length of the central tube, and
   spaced-apart at a distance with respect to the top surface of the distal end of the central tube.

8. The sub-assembly of the replaceable filter element according to claim 1, wherein the seal is arranged:
   directly adjacent the outer side surface of a portion of the length of the central tube, and
   directly adjacent the top surface of the distal end of the central tube.

9. The sub-assembly of the replaceable filter element according to claim 1, wherein the first segment forms a first constant thickness of the central tube, wherein the second segment forms a second constant thickness of the central tube, wherein the intermediate shoulder segment forms a non-constant thickness of the central tube, wherein the first thickness is less than the second thickness.

10. A filter element comprising:
a first end cap;
a second end cap having an annular base and defining a first central opening;
filter media extending between the first end cap and the second end cap surrounding an axis and defining an interior cavity;
a central tube integrally connected to the second end cap and circumscribing the first central opening, wherein the central tube includes: a proximal end that is integrally connected to the second end cap, a distal end opposite the proximal end, wherein the distal end forms a second central opening, an outer side surface extending between the proximal end and the distal end, wherein the outer side surface extends substantially perpendicularly with respect to an upper surface of the second end cap for an entire length of the central tube from the proximal end to the distal end, and an inner side surface extending between the proximal end and the distal end, wherein the inner side surface forms a central passage that extends through the central tube from the proximal end to the distal end, wherein access to the central passage is permitted by each of the first central opening and the second central opening, wherein the inner side surface includes: a first segment extending from the proximal end, an intermediate shoulder segment extending from the first segment, and a second segment extending from the intermediate shoulder segment, wherein the first segment forms the central passage to include a first constant diameter, wherein the second segment forms the central passage to include a second constant diameter, wherein the second diameter is less than the first diameter, wherein the intermediate shoulder segment forms the central passage to include a non-constant diameter, wherein the central tube extends into the interior cavity of the filter media and towards the first end cap; and
a seal disposed at least proximate a top surface of the distal end of the central tube, at least a portion of the seal being disposed adjacent the outer side surface of the central tube, and the seal being operable to prevent a flow of fluid from an outer side surface of the seal to the outer side surface of the central tube, the seal including a seal flange projecting radially outwardly from the portion of the seal disposed adjacent the outer side surface of the central tube, the seal flange directly engaging the second end cap,
wherein the distal end of the central tube includes a flange that projects radially inwardly from the inner side surface of the central tube to define the second central opening having a third diameter that is less than the second diameter, and
wherein the seal includes an inner radial surface that defines a third central opening having a fourth diameter that is less than the third diameter.

11. The filter element according to claim 10, wherein the flange of the distal end of the central tube resides between the seal and the second end cap.

12. The filter element according to claim 10, wherein the seal further comprises an elongate cylindrical portion having a first end and a second end and a flange portion extending radially inwardly from the second end, the flange portion having the inner radial surface that defines the third central opening such that the second opening of the central tube resides between the flange portion of the seal and the second end cap.

13. The filter element according to claim 10, wherein the seal is arranged:
directly adjacent the second end cap,
directly adjacent the outer side surface of the entire length of the central tube, and
spaced-apart at a distance with respect to the top surface of the distal end of the central tube.

14. The filter element according to claim 10, wherein the seal is arranged:
directly adjacent the outer side surface of a portion of the length of the central tube, and
directly adjacent the top surface of the distal end of the central tube.

15. The filter element according to claim 10, wherein the first segment forms a first constant thickness of the central tube, wherein the second segment forms a second constant thickness of the central tube, wherein the intermediate shoulder segment forms a non-constant thickness of the central tube, wherein the first thickness is less than the second thickness.

16. A sub-assembly of a replaceable filter element interfaceable with a standpipe, sub-assembly comprising:
an end cap defining a first central opening;
a central tube integrally connected to the end cap and circumscribing the first central opening, wherein the central tube includes: a proximal end that is integrally connected to the end cap, a distal end opposite the proximal end, wherein the distal end forms a second central opening, an outer side surface extending between the proximal end and the distal end, wherein the outer side surface extends substantially perpendicularly with respect to an upper surface of the end cap for an entire length of the central tube from the proximal end to the distal end, and an inner side surface extending between the proximal end and the distal end, wherein the inner side surface forms a central passage that extends through the central tube from the proximal end to the distal end, wherein access to the central passage is permitted by each of the first central opening and the second central opening wherein the inner side surface includes: a first segment extending from the proximal end, an intermediate shoulder segment extending from the first segment, and a second segment extending from the intermediate shoulder segment, wherein the first segment forms the central passage to include a first constant diameter, wherein the second segment forms the central passage to include a second constant diameter, wherein the second diameter is less than the first diameter, wherein the intermediate shoulder segment forms the central passage to include a non-constant diameter; and
a seal disposed at least proximate a top surface of the distal end of the central tube, at least a portion of the seal being disposed adjacent the outer side surface of the central tube, and the seal being operable to prevent a flow of fluid from an outer side surface of the seal to the outer side surface of the central tube,
wherein the distal end of the central tube includes a flange that projects radially inwardly from the inner side surface of the central tube to define the second central opening having a third diameter that is less than the second diameter,
wherein the seal includes an inner radial surface that defines a third central opening having a fourth diameter that is less than the third diameter, and
wherein the flange defines a radially-extending top surface and a radially-extending bottom surface opposite the top surface, the top surface and the bottom surface spaced-apart from the seal.

17. A filter element comprising:

a first end cap;

a second end cap having an annular base and defining a first central opening;

filter media extending between the first end cap and the second end cap surrounding an axis and defining an interior cavity;

a central tube integrally connected to the second end cap and circumscribing the first central opening, wherein the central tube includes: a proximal end that is integrally connected to the second end cap, a distal end opposite the proximal end, wherein the distal end forms a second central opening, an outer side surface extending between the proximal end and the distal end, wherein the outer side surface extends substantially perpendicularly with respect to an upper surface of the second end cap for an entire length of the central tube from the proximal end to the distal end, and an inner side surface extending between the proximal end and the distal end, wherein the inner side surface forms a central passage that extends through the central tube from the proximal end to the distal end, wherein access to the central passage is permitted by each of the first central opening and the second central opening, wherein the inner side surface includes: a first segment extending from the proximal end, an intermediate shoulder segment extending from the first segment, and a second segment extending from the intermediate shoulder segment, wherein the first segment forms the central passage to include a first constant diameter, wherein the second segment forms the central passage to include a second constant diameter, wherein the second diameter is less than the first diameter, Wherein the intermediate shoulder segment forms the central passage to include a non-constant diameter, wherein the central tube extends into the interior cavity of the filter media and towards the first end cap; and a seal disposed at least proximate a top surface of the distal end of the central tube, at least a portion of the seal being disposed adjacent the outer side surface of the central tube, and the seal being operable to prevent a flow of fluid from an outer side surface of the seal to the outer side surface of the central tube, wherein the distal end of the central tube includes a flange that projects radially inwardly from the inner side surface of the central tube to define the second central opening having a third diameter that is less than the second diameter, wherein the seal includes an inner radial surface that defines a third central opening having a fourth diameter that is less than the third diameter; and wherein the flange defines a radially-extending top surface and a radially-extending bottom surface opposite the top surface, the top surface and the bottom surface spaced-apart from the seal.

* * * * *